(No Model.)
O. TABER.
SADDLE.
No. 424,626. Patented Apr. 1, 1890.
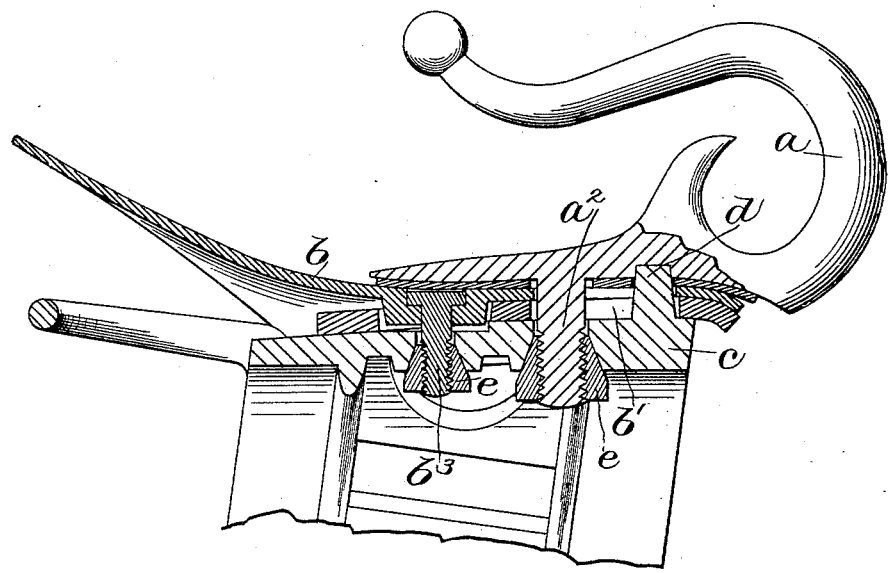
WITNESSES
Edgar A. Godden
Frederick Emery
INVENTOR
Orrin Taber,
by Crosby & Gregory
Attys.

UNITED STATES PATENT OFFICE.

ORRIN TABER, OF WILTON, ASSIGNOR TO THE NASHUA SADDLERY HARDWARE COMPANY, OF NASHUA, NEW HAMPSHIRE.

SADDLE.

SPECIFICATION forming part of Letters Patent No. 424,626, dated April 1, 1890.

Application filed December 3, 1889. Serial No. 332,431. (No model.)

*To all whom it may concern:*

Be it known that I, ORRIN TABER, of Wilton, county of Hillsborough, State of New Hampshire, have invented an Improvement in Saddles, of which the following description, in connection with the accompanying drawing, is a specification, like letters on the drawing representing like parts.

In another application, Serial No. 321,725, filed August 23, 1889, by Orrin Taber and Hamilton F. Low, a saddle is shown comprising a saddle-tree, seat, and checkrein-hook, and means for securing the parts together, and a steady-pin on the hook, which passes down through the seat to prevent rotation of the hook. As a means for securing the hook to the seat and tree, a lug was formed integral with the hook, which passed down through the seat and tree and was externally screw-threaded to receive a nut. In practice I find it is somewhat difficult to turn the thread on the lug, owing to the location of the steady-pin, and to cheapen the construction of the saddle as much as possible I have herein arranged the steady-pin on the tree, which passes up through the seat and enters a hole or socket formed in the hook, thereby entirely removing the steady-pin from the hook, so that it may be held by a suitable clutch and the lug thereon screw-threaded rapidly and without inconvenience.

This invention therefore comprehends a tree having a steady-pin formed integral with it, which passes up through the seat and into the hook, combined with a fastening for the hook, seat, and tree, which consists of a lug formed on the hook and a nut thereon.

The drawing shows in section and partial elevation a saddle embodying this invention.

The checkrein-hook $a$ has formed on its under side a lug $a^2$, which is made quite long and is externally screw-threaded. The seat $b$ has an opening $b'$ through it for the lug $a^2$, and the seat also has a hole through it to receive a bolt $b^3$. The tree $c$ has holes through it to receive the lugs $a^2$ of the hook and also the bolt $b^3$. As herein shown, conical nuts $e$ are turned on the bolt $b^3$ and also on the screw-threaded lug $a^2$, said nuts fitting countersinks or tapering sockets formed in the under side of the tree $c$, said conical nuts being prevented from turning easily by the friction produced by contact with the tree. A steady-pin $d$ is formed on the upper side of the tree, which passes up through a hole, as $b'$, for instance, in the seat $b$ and into a socket formed in the under side of the checkrein-hook $a$, said pin $d$ serving to prevent the checkrein-hook from rotating when the nut $e$ is tightened.

The steady-pin $d$ may be formed on the tree by casting or otherwise, as desired.

I claim—

In a saddle, the combination, with a checkrein-hook having a socket in its under side and also an externally-screw-threaded lug $a^2$ adjacent to said socket, of a seat having openings therein, and a tree, the seat being interposed between the hook and tree, the said lug $a^2$ passing through said seat and tree, a nut adapted to be held on the screw-threaded end of the said lug and bearing against the under side of the tree to constitute a fastening to hold the hook, seat, and tree together, and a steady-pin $d$, formed on the upper side of the tree and passing up through a hole in the seat and entering the socket in the hook, and a bolt $b^3$ as an additional fastening for the parts, substantially as described.

In testimony whereof I have signed my name to this specification in the presence of two subscribing witnesses.

ORRIN TABER.

Witnesses:
BERNICE J. NOYES,
FREDERICK L. EMERY.